Sept. 14, 1965            J. L. YOPP            3,206,164
INTERNALLY TRUNNIONED VALVE MEMBER
Filed Oct. 31, 1962
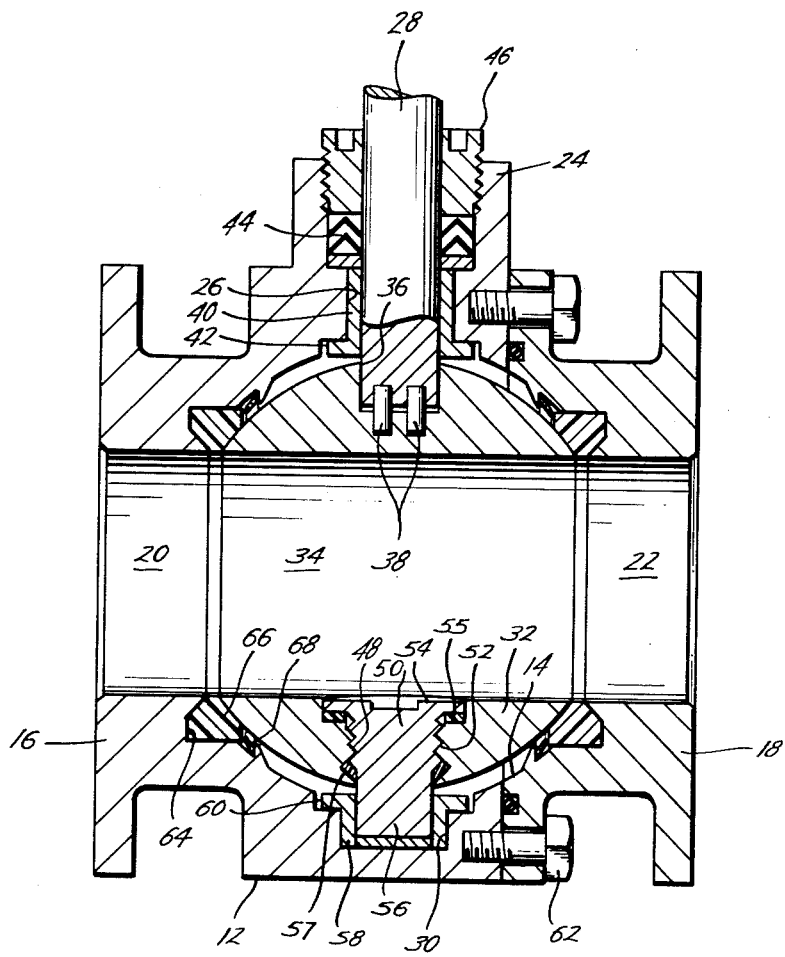
John L. Yopp
INVENTOR.
BY Russell E. Schloff
ATTORNEY

United States Patent Office 3,206,164
Patented Sept. 14, 1965

3,206,164
INTERNALLY TRUNNIONED VALVE MEMBER
John L. Yopp, Houston, Tex., assignor to ACF Industries, Incorporated, New York, N.Y., a corporation of New Jersey
Filed Oct. 31, 1962, Ser. No. 234,423
6 Claims. (Cl. 251—309)

This invention relates to an end entry ball valve and more particularly to one having an internally trunnioned valve member.

End entry ball valves are generally comprised of a cup shaped body having a valve chamber in which is positioned a rotatable, ported, spherical valve member. The valve member is provided with stem receiving means for receiving a stem which rotates the ball between the open and closed position. The stem extends through an aperture in the valve body. An end member closes the open end of the cup shaped body. Seats are provided which form a seal with the valve member. The end member and closed end have aligned passages which together with a port through the valve member form the run of the valve in the open position. Many of the end entry ball valves have a floating valve member, that is, the valve member is not retained in position and line pressure causes the valve member to float against the downstream seat. As a result, there is a high loading of the downstream seat. In some instances, it is desirable to have an upstream seal rather than a downstream seal in which case it is necessary to trunnion the valve member. The only known means to trunnion the valve member has been to either use a top entry construction which is, as a rule, more expensive or to provide an external trunnion extending from the exterior of the body. The external trunnion may be a source of leakage permitting escape of fluid traveling through the body.

It is the principal object of the present invention to provide a means whereby the valve member of an end entry ball valve may be trunnioned internally of the body thereby eliminating a possible source of leakage.

In order to accomplish the above object, the valve member is provided with an aperture diametrically opposed to the stem receiving means which extends from the port through the periphery of the valve member. A trunnion member extends through this aperture into a blind aperture in the valve body.

It is a further object of the present invention to provide an end entry ball valve having an internally trunnioned valve member which is economical to manufacture and easy to maintain.

It is a further object to provide an end entry ball valve with an internally trunnioned valve member wherein the assembly of the valve member of the valve is facilitated.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a cross section of an end entry ball valve having an internally trunnioned valve member.

The drawing discloses an end entry ball valve 10 which is comprised of a body 12 having a hollow internal area forming a valve chamber 14. The body may be generally cup shaped, as shown, having one end member 16 which is integral with the body 12 and a second end member 18 which is detachably connected to the body 12.

If desired, the body member may be tubular and both end members detachably connected to the body. The end members 16–18 are provided with aligned flow passages 20–22. The end of each end member is constructed so that the valve can be attached to a flow system, as is well known in the art. The body member 12 has a boss 24 which is provided with an aperture 26 that extends into the valve chamber 14. Diametrically opposed to the aperture 26 is a blind aperture 30.

Rotatably positioned in the valve chamber 14 is a spherical valve member 32 having a through port 34 which, when the valve is in the open position, is aligned with the passages 20–22 to form the run of the valve. The valve member 32 has stem receiving means 36 in the periphery thereof. The stem receiving means 36 may be a drilled or broached hole which matingly receives the end of a stem 28. Pins 38 provide means for the stem 28 to rotate the valve member 32. The stem 28 extends through the aperture 26 in the boss 24. A sleeve bearing 40 is interposed between the stem 28 and aperture 26. If desired, the bearing 40 may be formed with a shoulder which forms a thrust washer 42 for the valve member. Axially outward of the sleeve bearing 40, the aperture 26 is counterbored to receive packing 44 which prevents leakage. As is common in the art, a packing gland 46 is provided which will retain the packing 44 in tight contact with the stem 28 and the wall of the aperture 26.

In order that the valve member 32 will not float downstream and cause an exceedingly high bearing load on the downstream seat, it is necessary to trunnion the valve member. Such construction is also necessary if it is desired to have a pressure acting upstream seat rather than a compression type downstream seat. In order to trunnion the valve member 32, the valve member is provided with a threaded aperture 48 which is diametrically opposed to the stem receiving means 36. The aperture 48 extends from the port 34 through the periphery of the valve member. A trunnion member 50 formed of a threaded portion 52 extending from one end 54 and a trunnion portion 56 extending from the end of the threaded portion 52. The trunnion member 50 is threadedly engaged in the threaded aperture 48. The end 54 is provided with a slot or other means enabling the trunnion member 50 to be rotated. Also, the end 54 is so formed that it will conform with the configuration of the portion of the port where it is located. If desired, the port end of the threaded aperture 48 may be counterbored and end 54 enlarged. To keep the threaded aperture 48 clean so that the trunnion member 50 may be later easily disengaged, a sealing washer 55 may be placed in the counterbore and a second sealing washer 57 placed at the outer end of the threaded aperture 48. The trunnion portion 56 extends past the periphery of the valve member 32 and into the blind aperture 30. A sleeve bearing 58 is positioned between the trunnion portion 56 and the wall of the aperture 30. The sleeve bearing may have a shoulder 60 which will form a thrust bearing for the valve member.

The trunnioning of the valve member 32 takes place entirely internally of the valve housing and therefore there is no possibility of a leak as a result of the trunnioning of the valve member. The trunnioning is so designed that the valve member 32 may be positioned in the valve chamber 14, the stem 28 attached thereto and then the trunnion member 50 threaded into the aperture 48 through the port 34. If it is ever necessary to dismantle the valve, the valve member 32 may be disengaged by unthreading the trunnion member 50 from engagement with the aperture 48. This construction does not require an extensively large body and actually permits a body which closely envelops the valve member 32 permitting cutting down on the size of the valve body 12.

After the valve member 32 has been positioned in the valve chamber 14 and properly trunnioned, the end member 18 may then be attached to the end of the valve body 12 by use of threaded members 62.

The end members 16 and 18 are provided with annular seat pockets 64 in which are positioned pressure acting seats 66. These seats form a seal with valve member 32. To prevent possible extrusion of the seats 66 during the operation of the valve, retaining members 68 may be provided.

As can be seen from the foregoing, the present invention provides an end entry ball valve having an internally trunnioned valve member which is so designed that it is economical to manufacture and easy to assemble. The trunnioning of the valve member permits upstream sealing without providing a further possible source of leakage.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

What I claim is:

1. An end entry ball valve comprising:
   a cup shaped valve body, the hollow internal area forming a valve chamber, a boss on the body provided with an aperture that extends into the valve chamber, a blind aperture in the valve chamber diametrically opposed to the aperture in the boss, the closed end of the housing having a passage communicating with the valve chamber;
   a spherical valve member rotatably positioned in said valve chamber, said valve member having a port therethrough which in the open position of the valve is alignable with the passage in the closed end of the housing, stem receiving means in the periphery of the valve member, a threaded aperture, diametrically opposed to the stem receiving means, extending from the port through the valve member;
   a trunnion member formed of a threaded portion and a trunnion portion extending from one end of the threaded portion, the other end of the trunnion portion provided with driving means, the threaded portion threadedly engaged in the threaded aperture and the trunnion portion extending past the valve member into the blind aperture in the valve chamber, the driving means permitting engagement and disengagement of the trunnion member through the port;
   a sleeve bearing between the trunnion portion and the blind aperture;
   a thrust bearing between the trunnion portion and blind aperture;
   a stem extending through the aperture in the boss and engaged with the stem receiving means in the valve member;
   a sleeve bearing between the stem and aperture;
   a thrust bearing between the stem and aperture;
   means axially outward of the stem sleeve bearing forming a seal between the stem and aperture;
   an end member detachably secured to the open end of the cup shaped valve body, the end member having a passage aligned with the passage in the closed end of the valve body which together with the port in the valve member forms the run of the valve;
   at least one pressure acting seat member forming a seal with the valve member when it is in the closed position.

2. An end entry ball valve comprising:
   a cup shaped valve body, the hollow internal area forming a valve chamber, a boss on the body provided with an aperture that extends into the valve chamber, a blind aperture in the valve chamber diametrically opposed to the aperture in the boss, the closed end of the housing having a passage communicating with the valve chamber;
   a spherical valve member rotatably positioned in said valve chamber, said valve member having a port therethrough which in the open position of the valve is alignable with the passage in the closed end of the housing, stem receiving means in the periphery of the valve member, a threaded aperture, diametrically opposed to the stem receiving means, extending from the port through the valve member;
   a trunnion member formed of a threaded portion and a trunnion portion extending from one end of the threaded portion, the other end of the trunnion portion provided with driving means, the threaded portion threadedly engaged in the threaded aperture and the trunnion portion extending past the valve member into the blind aperture in the valve chamber, the driving means permitting engagement and disengagement of the trunnion member through the port;
   a stem extending through the aperture in the boss and engaged with the stem receiving means in the valve member;
   means forming a seal between the stem and aperture;
   an end member detachably secured to the open end of the cup shaped valve body, the end member having a passage aligned with the passage in the closed end of the valve body which together with the port in the valve member forms the run of the valve;
   at least one pressure acting seat member forming a seal with the valve member when it is in the closed position.

3. An end entry ball valve comprising:
   a valve body having a hollow internal area forming a valve chamber, a boss on the body provided with an aperture that extends into the valve chamber, a blind aperture in the valve chamber diametrically opposed to the aperture in the boss;
   a spherical valve member rotatably positioned in said valve chamber, said valve member having a port therethrough, stem receiving means in the periphery of the valve member, a threaded aperture, diametrically opposed to the stem receiving means, extending from the port through the valve member;
   a trunnion member formed of a threaded portion and a trunnion portion extending from one end of the threaded portion, the other end of the trunnion portion provided with driving means, the threaded portion threadedly engaged in the threaded aperture and the trunnion portion extending past the valve member into the blind aperture in the valve chamber, means forming at least a single seal between the trunnion member and the threaded aperture;
   a stem extending through the aperture in the boss and engaged with the stem receiving means in the valve member;
   means forming a seal between the stem and aperture;
   at least one end member detachably secured to the valve body, the end member having a passage aligned with the port in the valve member forms the run of the valve;
   at least one pressure acting seat member forming a seal with the valve member when it is in the closed position.

4. An end entry ball valve comprising:
   a tubular body having a boss which is provided with an aperture extending therethrough, a blind aperture diametrically opposed to the aperture in the boss;
   a spherical valve member rotatably positionable in said body, said valve member having a port therethrough, means in the periphery of the valve member to receive a stem, a threaded aperture diametrically opposed to the stem receiving means extending from the port through the valve member;
   a trunnion member having a threaded portion engageable with the threaded aperture in the valve member, means at one end of the threaded portion to drive the trunnion member into threaded engagement, a trunnion portion extending from the other end of the threaded portion positioned in the blind aperture of the body, means establishing a fluid-tight seal between said trunnion member and said plug member;

a stem extending through the aperture in the boss and engaged with the stem receiving means in the valve member;

means forming a seal between the aperture and stem;

at least one end member attached to the tubular body closing the body, passages which when the port is aligned therewith form the run of the valve;

a seat member forming an upstream seal with the valve member.

5. An end entry ball valve comprising:

a tubular body having a boss which is provided with an aperture extending therethrough, a blind aperture diametrically opposed to the aperture in the boss;

a spherical valve member rotatably positioned in said body, said valve member having stem receiving means formed in the periphery thereof, a threaded aperture formed in said valve member and being diametrically opposed to and axially aligned with the stem receiving means, a through port in the valve member the axis of which is normal to the axis of the stem receiving means and the axis of said threaded aperture;

a trunnion member having a threaded portion engaged with the threaded aperture in the valve member, means at one end of the threaded portion for driving the trunnion member into threaded engagement from the port, means forming at least one fluid-tight seal between said trunnion member and said valve member, a trunnion portion extending from the other end of the threaded portion positioned in the blind aperture of the body;

a sleeve bearing located in the blind aperture between the trunnion portion and the blind aperture, the sleeve bearing having a collar forming a thrust bearing for the valve member;

a stem extending through the aperture in the boss and engaged with the stem receiving means in the valve member;

a sleeve bearing between the stem and aperture;

means forming a seal between the aperture and stem;

end members attached to the tubular body closing the body, each end member having a passage which when the port is aligned therewith forms the run of the valve;

pressure acting seat members in the end members forming an upstream seal with the valve member.

6. An end entry ball valve comprising:

a tubular body having a boss which is provided with an aperture extending therethrough, a blind aperture diametrically opposed to the aperture in the boss;

a spherical valve member rotatably positionable in said body, said valve member having a port therethrough, means in the periphery of the valve member to receive a stem, a threaded aperture diametrically opposed to the stem receiving means extending from the port through the valve member;

a trunnion member having a threaded portion engageable with the threaded aperture in the valve member, a trunnion portion extending from one end of the threaded portion and positioned in the blind aperture of the body, means forming a seal between said trunnion member and said valve member at one end of said threaded portion, means forming a seal between said trunnion member and said valve member at the other end of said threaded portion;

a stem extending through the aperture in the boss and engaged with the stem receiving means in the valve member;

means forming a seal between the aperture and stem;

at least one end member attached to the tubular body closing the body;

a pressure actuated seat member forming an upstream seal with the valve member.

References Cited by the Examiner

UNITED STATES PATENTS

| | | | |
|---|---|---|---|
| 2,929,606 | 3/60 | Kaiser | 251—309 X |
| 2,989,990 | 6/61 | Bass | 251—315 X |
| 3,077,895 | 2/63 | Vickery | 251—315 X |

FOREIGN PATENTS 1,172,335 10/58 France.

M. CARY NELSON, *Primary Examiner.*